US006871728B2

United States Patent
Kamiya et al.

(10) Patent No.: US 6,871,728 B2
(45) Date of Patent: Mar. 29, 2005

(54) VEHICLE BRAKE DEVICE

(75) Inventors: Masahiko Kamiya, Anjo (JP); Hiroshi Kondo, Chiryu (JP); Shin Sasaki, Okazaki (JP); Daizo Oba, Kariya (JP)

(73) Assignee: Advics Co., Ltd., Aichi (JP)

( * ) Notice: Subject to any disclaimer, the term of this patent is extended or adjusted under 35 U.S.C. 154(b) by 0 days.

(21) Appl. No.: 10/816,880

(22) Filed: Apr. 5, 2004

(65) Prior Publication Data

US 2004/0201273 A1 Oct. 14, 2004

(30) Foreign Application Priority Data

Apr. 10, 2003 (JP) ........................................ 2003-106724

(51) Int. Cl.$^7$ .............................................. F16D 66/00
(52) U.S. Cl. ..................... 188/1.11; 188/71.7; 303/16.3; 303/3
(58) Field of Search ...................... 188/1.11 R, 1.11 W, 188/1.11 E, 1.11 L, 71.8, 71.7, 196 R, 196 A; 303/DIG. 1, DIG. 2, DIG. 3, 155, 3, 15, 20

(56) References Cited

U.S. PATENT DOCUMENTS 6,095,289 A * 8/2000 Ray et al. ............... 188/1.11 E
6,417,768 B2 * 7/2002 Osterman et al. ........... 340/479

FOREIGN PATENT DOCUMENTS

JP 2002-347598 12/2002

* cited by examiner

Primary Examiner—Matthew C. Graham
(74) Attorney, Agent, or Firm—Burns, Doane, Swecker & Mathis, L.L.P.

(57) ABSTRACT

A vehicle brake device having a hydraulic pressure generating source is proposed which can reliably prevent dragging and ensure the initial response of brakes during braking. In a brake fluid supply passage from the master cylinder to the wheel cylinder, a brake fluid circulating passage having a hydraulic pressure generating source is provided. A detector for detecting whether the brake pedal is being operated, and a detector for detecting dragging of the brake pads are provided, and only when dragging is detected while the brake pedal is not being operated, the hydraulic pressure generating source is actuated for a predetermined time with a supply valve provided in the brake fluid circulating passage closed and a return valve open to suck brake fluid in the wheel cylinder and increase the distances between the brake pads and the disk rotor, thereby reliably preventing dragging.

6 Claims, 2 Drawing Sheets

VEHICLE BRAKE DEVICE

BACKGROUND OF THE INVENTION

This invention relates to a vehicle brake device having a hydraulic pressure generating source for generating brake hydraulic pressure, particularly to a vehicle brake device which can prevent dragging of brake pads.

Vehicle brake devices are known in which a brake fluid circulating passage including a hydraulic pressure generating source is provided in a brake fluid supply passage for supplying brake fluid from a master cylinder to wheel cylinders to assist brake operations of the driver, and the operating force or operating amount of the brake pedal is detected as electric signals to drive the hydraulic pressure generating source based on these electric signals, thereby carrying out control of the brake hydraulic pressure while sensing the intention of the driver.

Further, there are also known vehicle brake devices having an automatic pressure increase function in which a communication valve is provided between the discharge side of the hydraulic pressure generating source and the master cylinder, and a shutoff valve is provided in a passage through which the intake side of the hydraulic pressure generating source and the master cylinder communicates to drive the hydraulic pressure generating source according to the travel state of the vehicle, which is detected as electric signals, thereby controlling the brake hydraulic pressure.

On the other hand, in vehicle brake devices in which brake pads are pressed against each disk rotor under the brake hydraulic pressure of a wheel cylinder, brake pads may contact the disk rotor even though the brake pedal is not operated due e.g. to uneven wear of the brake pads, thus causing so-called dragging. Such dragging causes lowering of fuel cost and further quicken uneven wear of the brake pads.

In order to prevent such dragging, there is known one in which using the above vehicle brake device which has a hydraulic pressure generating source, a pump as the hydraulic pressure generating source is driven for a predetermined time while the brake pedal is being released and the accelerator pedal is being operated to reduce the brake pressure of the wheel cylinders, thereby increasing the distances between the brake pads and the disk rotor (e.g. see JP patent publication 2002-347598 (pages 3–7, FIGS. 4–5).

In such a conventional dragging preventive means which uses a hydraulic pressure generating source, every time the accelerator pedal is operated during travel of the vehicle, the pump as the hydraulic pressure source is frequently activated. Thus, in order to ensure durability of the pump, it is necessary to employ a brushless motor or a motor having a large brush. This increases the price and size of the motor. Further, operating sounds of the pump will give uncomfortableness to the driver.

Further, if the distances between the brake pads and the disk rotors increase while the accelerator pedal is being operated, initial response of the brakes during braking tends to be delayed. This prolongs the braking distance. Further, the initial useless stepping feeling when the brake pedal is stepped in is large. Thus light brake operating feeling may be impaired.

An object of this invention is to properly prevent dragging without a waste and ensure initial response of brakes during braking by using a vehicle brake device having a hydraulic pressure generating source.

SUMMARY OF THE INVENTION

According to this invention, there is provided a vehicle brake device comprising a master cylinder coupled to a brake pedal, a wheel cylinder for pressing brake pads against a disk rotor under brake hydraulic pressure, a brake fluid supply passage for supplying brake fluid from the master cylinder to the wheel cylinder, a hydraulic pressure generating source for generating brake hydraulic pressure a brake fluid circulating passage disposed in the brake fluid supply passage and having the hydraulic pressure generating source, a supply valve provided on the discharge side of the hydraulic pressure generating source in the brake fluid circulating passage for supplying brake fluid to the wheel cylinder, and a return valve provided on the suction side of the hydraulic pressure generating source for returning brake fluid from the wheel cylinder to control the brake hydraulic pressure in the wheel cylinder, and further comprising a detector for detecting whether the brake pedal is being operated, and a dragging detector for detecting dragging of the brake pads by the disk rotor, wherein if dragging is detected by the dragging detector with the brake pedal not operated, the hydraulic pressure generating source is actuated for a predetermined time with the supply valve closed and the return valve opened to draw the brake fluid in the wheel cylinder into the brake fluid circulating passage, thereby increasing the distance between the brake pad and the disk rotor.

That is, a detector for detecting whether the brake pedal is being operated, and a detector for detecting dragging of the brake pads are provided, and the hydraulic pressure generating source is actuated for a predetermined time with the supply valve in the brake fluid circulating passage closed and the return valve open only if dragging is detected with the brake pedal not operated, to suck the brake fluid in the wheel cylinder and increase the distances between the brake pads and the disk rotor, thereby reliably preventing dragging.

Further, this invention is applicable to a vehicle brake device in which in order to provide an automatic pressure increase function according to the travel state of the vehicle, a communication valve is provided in the brake fluid supply passage between the discharge side of the hydraulic pressure generating source and the master cylinder, and a shutoff valve is provided in a passage through which the suction side of the hydraulic pressure generating source communicates with the master cylinder. The communication valve is opened and the shutoff valve is closed if dragging is detected by the dragging detector with the brake pedal not operated, thereby preventing dragging reliably.

Further, by providing a detector for detecting the tendency of the operation of the brake pedal to start, and actuating the hydraulic pressure generating source with the supply valve open and the return valve closed when the tendency of the operation of the brake pedal to start is detected, brake fluid is supplied into the wheel cylinder from the brake fluid circulating passage, thereby reducing the distances between the brake pads and the disk rotor. This makes it possible to quicken initial response of the brake during braking, thus shortening the braking distance. As a detector for detecting the tendency of the brake pedal operation to start, for example, by detecting release of the accelerator pedal, the next brake pedal operation may be predicted.

In an arrangement in which a communication valve is provided in the brake fluid supply passage between the discharge side of the hydraulic pressure generating source and the master cylinder, and a shutoff valve is provided in a passage through which the suction side of the hydraulic pressure generating source communicates with the master cylinder, by actuating the hydraulic pressure generating source with the supply valve open, the return valve closed, the communication valve closed, and the shutoff valve open when the tendency of the operation of the brake pedal to start is detected, to supply brake fluid into the wheel cylinder from the brake fluid circulating passage, the distances between the brake pads and the disk rotor can be reduced.

Thus, in an arrangement in which by detecting the tendency of the brake pedal operation to start, the hydraulic pressure generating source is actuated to supply brake fluid into the wheel cylinder from the brake fluid supply passage, thereby reducing the distances between the brake pads and the disk rotor, stable initial response of the brake is ensured by opening and closing the supply valve and the return valve to adjust the brake hydraulic pressure in the wheel cylinder to a predetermined value, thereby adjusting the distances between the brake pads and the disk rotor.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
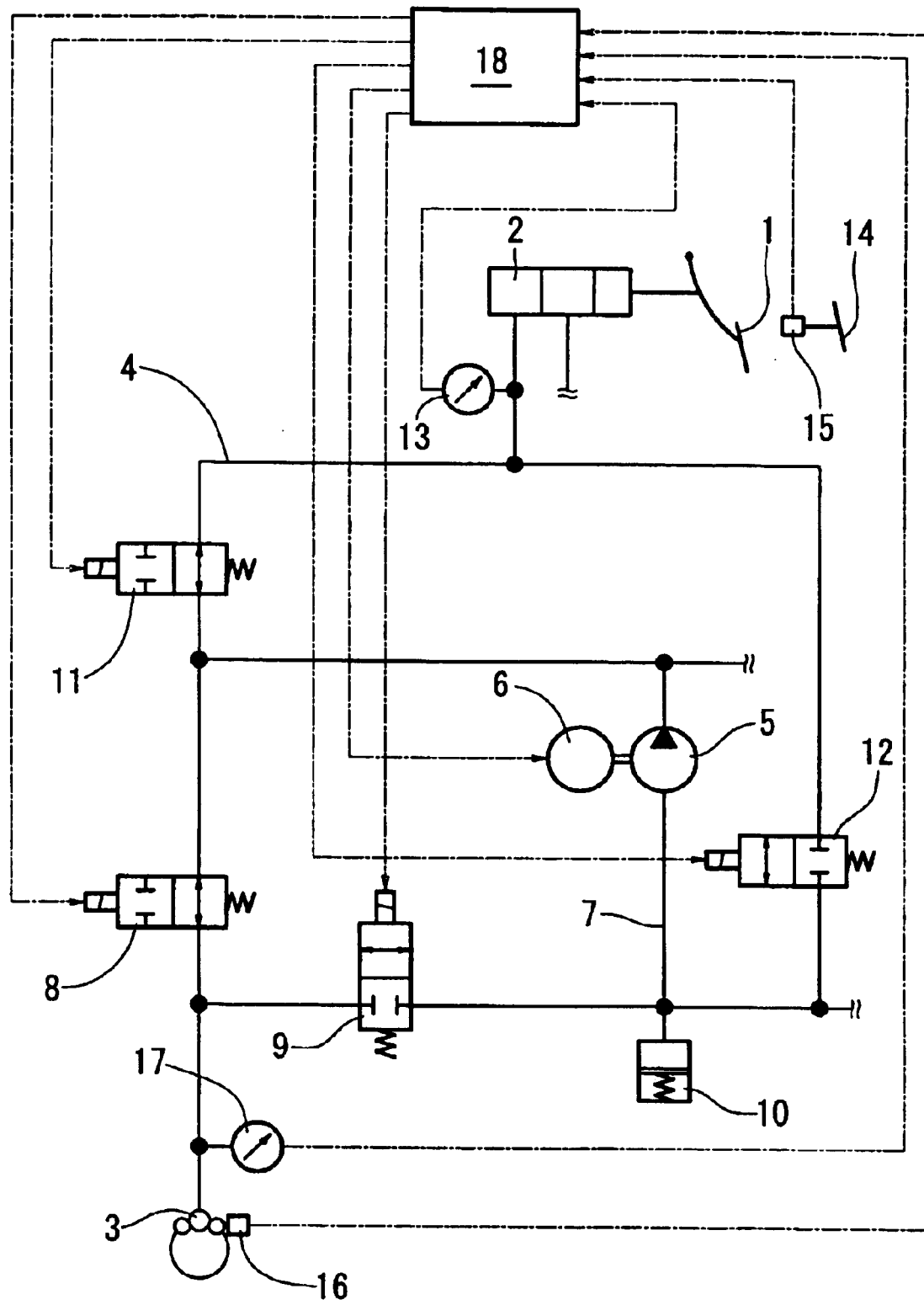
FIG. 1 is a system diagram showing the vehicle brake device embodying this invention.

Referring to the drawings, the embodiment of this invention will be described. As shown in FIG. 1, this vehicle brake device comprises a master cylinder 2 coupled to a brake pedal 1, a wheel cylinder 3 for pressing brake pads against a disk rotor under brake hydraulic pressure, a brake fluid supply passage 4 for supplying brake fluid from the master cylinder 2 to the wheel cylinder 3, and a brake fluid circulating passage 7 disposed in the supply passage 4 and including a pump 5 and a motor 6 as a hydraulic pressure generating source for generating brake hydraulic pressure in the wheel cylinder 3. On the discharge side of the pump 5 in the circulating passage 7, a supply valve 8 for supplying brake fluid toward the wheel cylinder 3 is provided, and on the suction side of the pump 5, a return valve 9 for brake fluid from the wheel cylinder 3 and a reservoir 10 are provided. Further, between the discharge side of the pump 5 in the supply passage 4 and the master cylinder 2, a communication valve 11 is provided. In a passage through which the suction side of the pump 5 and the master cylinder 2 communicate, a shutoff valve 12 is provided. The supply valve 8, return valve 9, communication valve 11 and shutoff valve 12 are all solenoid valves.

While not shown, there are two hydraulic systems extending from the master cylinder. Also, the discharge side and the suction side of the pump 5 in the circulating passage 7 are connected to the circulating passages 7 for all vehicle wheels, and the pump 5 and motor 6, and the communication valve 11 and shutoff valve 12 are commonly used for a plurality of wheel cylinders 3.

To the master cylinder 2, a master cylinder pressure sensor 13 for detecting the amount of rise of the master cylinder pressure when the brake pedal 1 is depressed is mounted. An accelerator pedal 14, too, is provided with an accelerator opening sensor 15 for detecting its stepping force. To the wheel cylinder 3, a pressing force sensor 16 for detecting the pressing force against the brake pads, as well as a pressure sensor 17 for detecting its brake hydraulic pressure is mounted.

The outputs of the master cylinder pressure sensor 13, the accelerator opening sensor 15, the pressing force sensor 16 and the pressure sensor 17 are input in a controller 18. Based on these outputs, the controller 18 will control actuation of the motor 6 and the respective solenoid valves of the supply valve 8, return valve 9, communication valve 11 and shutoff valve 12.

It will be described how the vehicle brake device is controlled by the controller 18. First, a control method in a state in which no pressing force to the brake pads is detected by the pressing force sensor 16 while step-in of the brake pedal 1 is not being detected by the master cylinder pressure sensor 13, namely, in a normal state in which there exists no dragging, will be briefly described.

In this normal state, when step-in of the brake pedal 1 is detected, the controller 18 will open the supply valve 8 and the communication valve 11 to let the master cylinder 2 and the wheel cylinder 3 communicate with each other, drive the motor 6 as necessary, and open and close the return valve 9 and the shutoff valve 12 to control the brake hydraulic pressure of the wheel cylinder 3.

Figure 2:
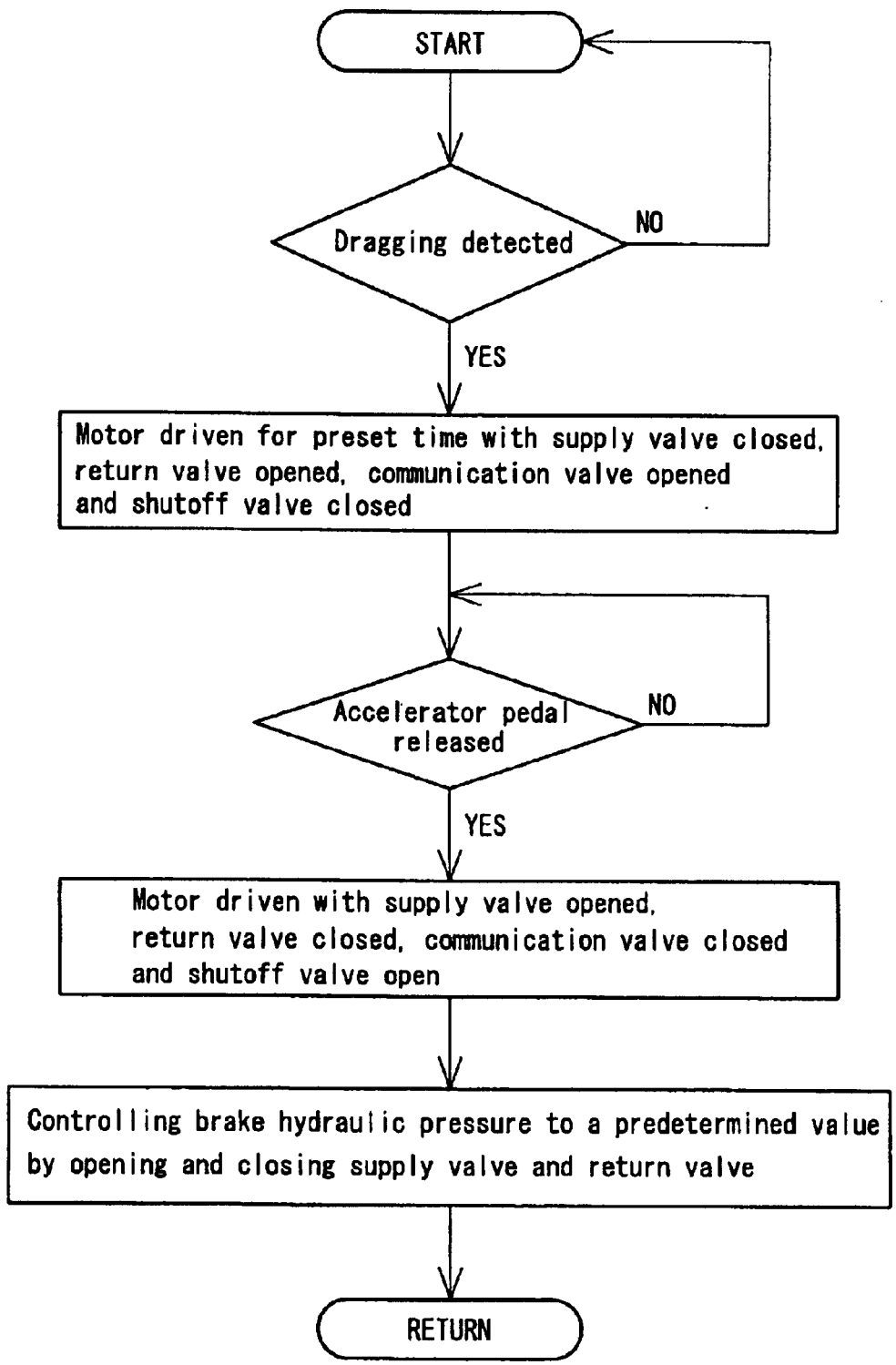
FIG. 2 is a control flowchart explaining the drag preventive function of the brake device of FIG. 1.

Next, a control method in a state in which there exists dragging, in which pressing force to the brake pads is detected by the pressing force sensor 16 while step-in of the brake pedal 1 is not being detected by the master cylinder pressure sensor 13, will be described with reference to the flowchart of FIG. 2.

If dragging is detected by the pressing force sensor 16, the controller 18 will drive the motor 6 for a certain time with the supply valve 8 closed and the return valve 9 open to suck brake fluid in the wheel cylinder 3 through the circulating passage 7 and return it to the master cylinder 2 to increase the distances between the brake pads and the disk rotor.

Thereafter, when the release of the accelerator pedal 14 is detected by the accelerator opening sensor 15, the controller 18 will drive the motor 6 with the supply valve 8 open, return valve 9 closed, communication valve 11 closed and shutoff valve 12 open to supply brake fluid from the reservoir 10 in the circulating passage 7 toward the wheel cylinder 3, thereby reducing the distances between the brake pads and the disk rotor. Such a distance adjustment is carried out by adjusting the brake hydraulic pressure of the wheel cylinder 3 to a predetermined value by opening and closing the supply valve 8 and the return valve 9 while checking the outputs of the pressure sensor 17 and the pressing force sensor 16.

The above embodiment has been described with an assumption that it has an automatic pressure increase function. But if only dragging prevention is carried out, the communication valve 11 in the supply passage 4 and the passage in which is provided the shutoff valve 12 may be omitted. Further, sensors for detecting step-in of the brake pedal and the accelerator pedal, and a sensor for detecting pressing to the brake pads are not limited to force sensors as in the embodiment. Displacement sensors, force sensors, etc. may be used instead.

As described above, in the vehicle brake device of this invention, a brake fluid circulating passage having a hydraulic pressure generating source is provided in the brake fluid supply passage from the master cylinder to the wheel cylinder, a detector for detecting whether the brake pedal is being operated, and a detector for detecting dragging of the brake pads are provided, and only when dragging is detected while the brake pedal is not being operated, the hydraulic pressure generating source is actuated for a predetermined time with the supply valve provided in the brake fluid circulating passage closed and the return valve open to increase the distances between the brake pads and the disk rotor by sucking brake fluid in the wheel cylinder, thereby preventing dragging. Thus it is not necessary to use a large brush motor or an expensive brushless motor as the motor for the hydraulic pressure generating source, and the hydraulic pressure generating source produces no frequent actuating sounds, which give uncomfortableness to the driver.

By providing a detector for detecting the tendency of the brake pedal operation to start, and actuating the hydraulic pressure generating source with the supply valve open and the return valve closed to supply brake fluid from the brake fluid circulating passage to the wheel cylinder, thereby reducing the distances between the brake pads and the disk rotor, it is possible to quicken the initial response of the brakes during braking, thereby eliminating useless brake stepping feelings of the driver and shortening the braking distance.

By opening and closing the supply valve and the return valve to adjust the brake hydraulic pressure in the wheel cylinder to a predetermined value and adjust the distances between the brake pads and the disk rotor, it is possible to ensure stable initial response of the brakes and give the driver proper operating feelings.

What is claimed is:

1. A vehicle brake device comprising a master cylinder coupled to a brake pedal, a wheel cylinder for pressing brake pads against a disk rotor under brake hydraulic pressure, a brake fluid supply passage for supplying brake fluid from said master cylinder to said wheel cylinder, a hydraulic pressure generating source for generating brake hydraulic pressure, a brake fluid circulating passage disposed in said brake fluid supply passage and having said hydraulic pressure generating source, a supply valve provided on the discharge side of said hydraulic pressure generating source in said brake fluid circulating passage for supplying brake fluid to said wheel cylinder, and a return valve provided on the suction side of said hydraulic pressure generating source for returning brake fluid from said wheel cylinder to control the brake hydraulic pressure in said wheel cylinder, and further comprising a detector for detecting whether the brake pedal is being operated, and a dragging detector for detecting dragging of said brake pads by said disk rotor, wherein if dragging is detected by said dragging detector with said brake pedal not operated, said hydraulic pressure generating source is actuated for a predetermined time with said supply valve closed and said return valve opened to draw the brake fluid in said wheel cylinder into said brake fluid circulating passage, thereby increasing the distance between said brake pad and said disk rotor.

2. A vehicle brake device as claimed in claim 1 wherein a communication valve is provided in said brake fluid supply passage between the discharge side of said hydraulic pressure generating source and said master cylinder, and a shutoff valve is provided in a passage through which the suction side of said hydraulic pressure generating source communicates with said master cylinder, and said communication valve is opened and said shutoff valve is closed if dragging is detected by said dragging detector with said brake pedal not operated.

3. A vehicle brake device as claimed in claim 1 wherein it comprises a detector for detecting the tendency of the operation of said brake pedal to start, and if the tendency of the operation of the brake pedal to start is detected, said hydraulic pressure generating source is actuated with said supply valve open and said return valve closed to supply brake fluid into said wheel cylinder from said brake fluid circulating passage, thereby decreasing the distance between said brake pad and said disk rotor.

4. A vehicle brake device as claimed in claim 2 wherein it comprises a detector for detecting the tendency of the operation of said brake pedal to start, and if the tendency of the operation of the brake pedal to start is detected, said hydraulic pressure generating source is actuated with said supply valve open, said return valve closed, said communication valve closed, and said shutoff valve open to supply brake fluid into said wheel cylinder from said brake fluid circulating passage, thereby decreasing the distance between said brake pad and said disk rotor.

5. A vehicle brake device as claimed in claim 3 wherein the distances between said brake pads and said disk rotor are adjusted by adjusting the brake hydraulic pressure in said wheel cylinder to a predetermined value by opening and closing said supply valve and said return valve.

6. A vehicle brake device as claimed in claim 4 wherein the distances between said brake pads and said disk rotor are adjusted by adjusting the brake hydraulic pressure in said wheel cylinder to a predetermined value by opening and closing said supply valve and said return valve.

* * * * *